(12) United States Patent
Steele et al.

(10) Patent No.: US 9,565,430 B1
(45) Date of Patent: Feb. 7, 2017

(54) APPARATUS AND METHOD FOR VIDEO ENCODING AND TRANSCODING SYSTEM

(71) Applicant: KingdomSite Ministries, Hixson, TN (US)

(72) Inventors: Steve Steele, Hixson, TN (US); Christopher Klapp, Signal Mountain, TN (US); Nicholas Ricketts, Chattanooga, TN (US); Andrew Steele, Harrison, TN (US); Jonathan Morua, Chattanooga, TN (US); Roberto Rios, Hixson, TN (US); Terrence Cox, Chattanooga, TN (US); Mike Wade, Soddy Daisy, TN (US)

( * ) Notice: Subject to any disclaimer, the term of this patent is extended or adjusted under 35 U.S.C. 154(b) by 167 days.

(21) Appl. No.: 13/713,969

(22) Filed: Dec. 13, 2012

Related U.S. Application Data

(60) Provisional application No. 61/630,651, filed on Dec. 15, 2011.

(51) Int. Cl.
  *H04N 7/12* (2006.01)
  *H04N 19/146* (2014.01)
(52) U.S. Cl.
  CPC .............................. *H04N 19/00169* (2013.01)

(58) Field of Classification Search
  CPC ................................................. H04N 7/26941
  See application file for complete search history.

(56) References Cited

U.S. PATENT DOCUMENTS

2011/0289108 A1* 11/2011 Bhandari et al. ............. 707/769

\* cited by examiner

*Primary Examiner* — Sath V Perungavoor
*Assistant Examiner* — Kate Luo
(74) *Attorney, Agent, or Firm* — Chambliss, Bahner & Stophel, P.C.

(57) ABSTRACT

A video encoding and transcoding system comprising a video content display unit that has a platform, a browser and a bandwidth and is adapted to display video content, a storage server that is adapted to receive video content, and a video encoder that is adapted to download video content and transcode video content. The preferred system automatically determines the platform, the browser and the bandwidth of the video content display unit and automatically selects the most optimized video format using real time adaptive bit rate switching in HTML5. A method for encoding and transcoding video content comprising providing a video encoding and transcoding system, visiting a video encoder website, selecting a resolution, uploading a video to a storage server, triggering an encoder, downloading a copy of the video, transcoding the video to a selected resolution, and uploading the video to the storage server.

19 Claims, 2 Drawing Sheets

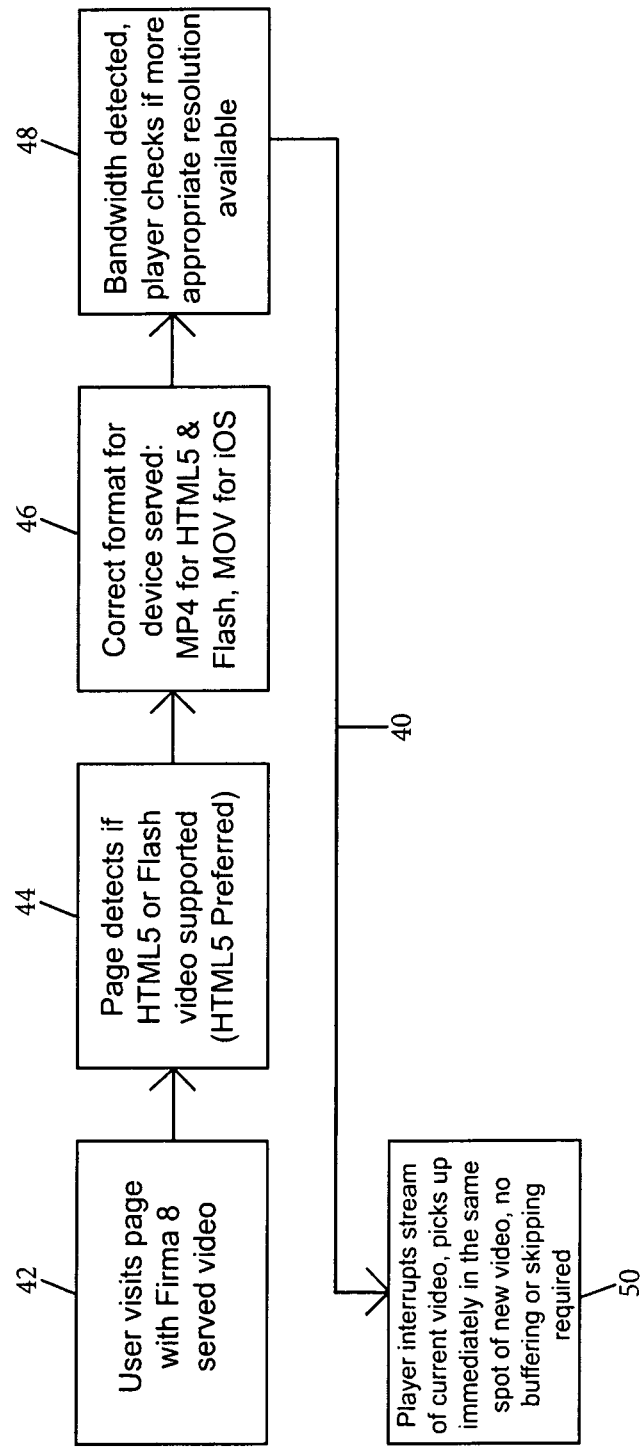

APPARATUS AND METHOD FOR VIDEO ENCODING AND TRANSCODING SYSTEM

CROSS-REFERENCES TO RELATED APPLICATIONS/PATENTS

This application relates back to and claims priority from U.S. Provisional Application for Patent Ser. No. 61/630,651 titled "Apparatus and Method for Video and Encoding and Transcoding System" and filed on Dec. 15, 2011.

FIELD OF THE INVENTION

The present invention relates generally to video encoding and transcoding systems, and particularly to video encoding and transcoding systems with real time adaptive bit rate switching.

BACKGROUND AND DESCRIPTION OF THE PRIOR ART

It is known to encode and transcode video content into multiple resolutions and formats. Conventional video encoding and transcoding systems, however, suffer from one or more disadvantages. For example, conventional video encoding and transcoding systems do not automatically determine the platform on which the video content is going to be played such as a personal computer, a Mac, a tablet, a smartphone and the like. Conventional video encoding and transcoding systems also do not automatically determine the bandwidth that is available to stream the video content. Further, conventional video encoding and transcoding systems do not automatically stream the video content in the optimized format. Still further, conventional video encoding and transcoding systems result in undesirable re-buffering and re-caching of memory. Conventional video encoding and transcoding systems also do not dynamically translate video content in one language to video content in a different language. Further, conventional video encoding and transcoding systems do not sufficiently reduce the size of video content files. It would be desirable, therefore, if an apparatus and method could be provided that would automatically determine the platform on which the video content is going to be played such as a personal computer, a Mac, a tablet, a smartphone and the like. It would also be desirable if such an apparatus and method could be provided that would automatically determine the bandwidth that is available to stream the video content. It would be further desirable if such an apparatus and method could be provided that would automatically stream the video content in the optimized format. It would be still further desirable if such an apparatus and method could be provided that would reduce or eliminate undesirable re-buffering and re-caching of memory. In addition, it would be desirable if such an apparatus and method could be provided that would dynamically translate video content in one language to video content in a different language. It would also be desirable if such an apparatus and method could be provided that would sufficiently reduce the size of video content files.

Advantages of the Preferred Embodiments of the Invention

It is an advantage of the preferred embodiments of the invention described and claimed herein to provide a video encoding and transcoding system that automatically determines the platform on which the video content is going to be played such as a personal computer, a Mac, a tablet, a smartphone and the like. It is also an advantage of the preferred embodiments of the invention to provide a video encoding and transcoding system that automatically determines the bandwidth that is available to stream the video content. It is another advantage of the preferred embodiments of the invention to provide a video encoding and transcoding system that automatically streams the video content in the optimized format. It is a further advantage of the preferred embodiments of the invention to provide a video encoding and transcoding system that reduces or eliminates undesirable re-buffering and re-caching of memory. It is a still further advantage of the preferred embodiments of the invention to provide a video encoding and transcoding system that dynamically translates video content in one language to video content in a different language. It is also an advantage of the preferred embodiments of the invention to provide a video encoding and transcoding system that sufficiently reduces the size of video content files.

Additional advantages of the preferred embodiments of the invention will become apparent from an examination of the drawings and the ensuing description.

SUMMARY OF THE INVENTION

The apparatus of the invention comprises a video encoding and transcoding system. The preferred system comprises a video content display unit that has a platform, a browser and a bandwidth and is adapted to display video content, a storage server that is adapted to receive video content, and a video encoder that is adapted to download video content and transcode video content. The preferred system automatically determines the platform, the browser and the bandwidth of the video content display unit and automatically selects the most optimized video format using real time adaptive bit rate switching in HTML5.

The method of the invention comprises a method for encoding and transcoding video content. The preferred method comprises providing a video encoding and transcoding system, visiting a video encoder website, selecting a resolution, uploading a video to a storage server, triggering an encoder, downloading a copy of the video, transcoding the video to a selected resolution, and uploading the video to the storage server.

BRIEF DESCRIPTION OF THE DRAWINGS

The presently preferred embodiments of the invention are illustrated in the accompanying drawings, in which like reference numerals represent like parts throughout, and in which:

FIG. 2 is a flow chart of a first alternative embodiment of the video encoding and transcoding system in accordance with the present invention.

DESCRIPTION OF THE PREFERRED EMBODIMENTS OF THE INVENTION

Figure 1:
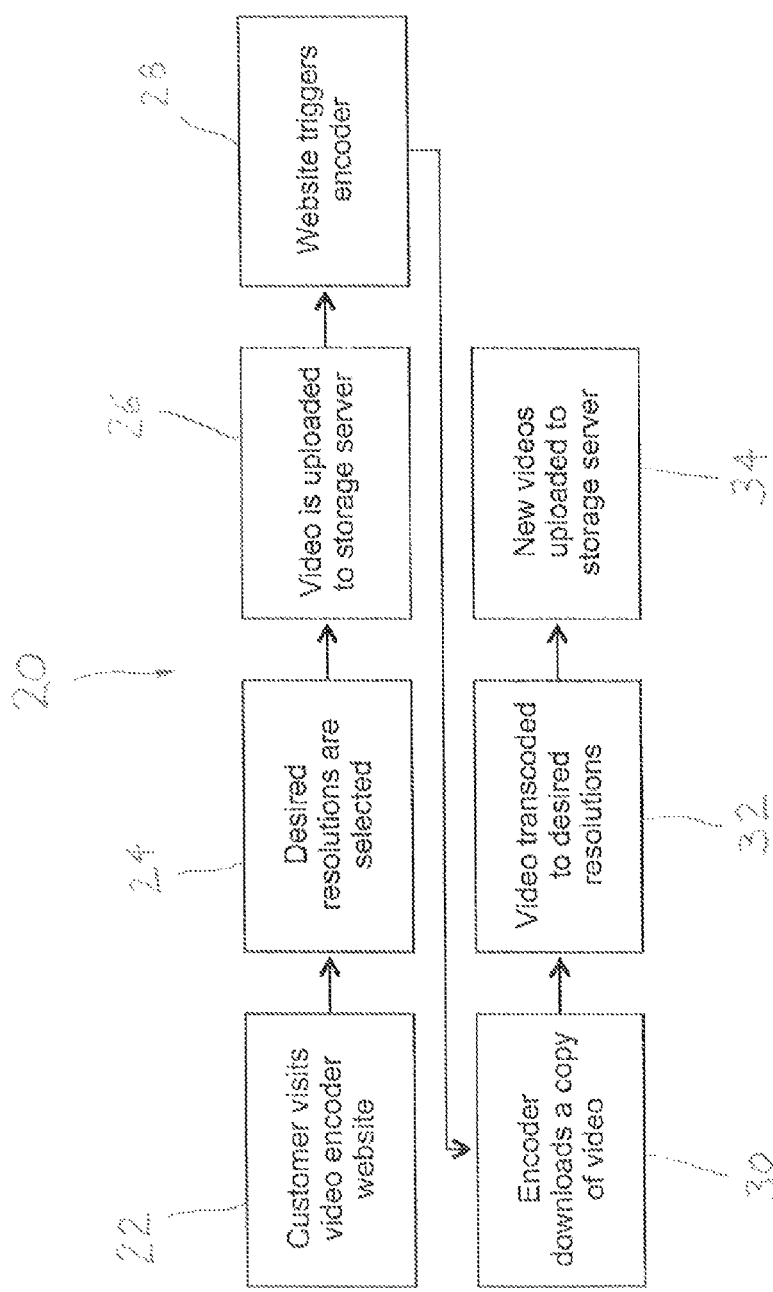
FIG. 1 is a flow chart of the preferred embodiment of the video encoding and transcoding system in accordance with the present invention.

Referring now to the drawings, the preferred embodiment of the video encoding and transcoding system in accordance with the present invention is illustrated by FIG. 1. As shown in FIG. 1, the preferred embodiments of the video encoding and transcoding system are adapted to automatically determine the platform of the video content display unit on which the video content is going to be played such as a personal computer, a Mac, a tablet, a smartphone and the like. The preferred embodiments of the video encoding and transcoding system are adapted to automatically determine the bandwidth that is available to stream the video content. The preferred embodiments of the video encoding and transcoding system are adapted to automatically stream the video content in the optimized format. The preferred embodiments of the video encoding and transcoding system are adapted to reduce or eliminate undesirable re-buffering and re-caching of memory. The preferred embodiments of the video encoding and transcoding system are adapted to dynamically translate video content in one language to video content in a different language. The preferred embodiments of the video encoding and transcoding system are adapted to sufficiently reduce the size of video content files.

Referring now to FIG. 1, a schematic block diagram of the preferred video encoding and transcoding system that includes exemplary processes which are configured to cooperate in accordance with the present invention is illustrated. As shown in FIG. 1, the preferred video encoding and transcoding system is designated generally by reference numeral 20. In preferred video encoding and transcoding system 20, the originating video content is adapted to upload a raw file to a storage server where an automated process to encode and/or transcode the video content into different formats takes place. Preferred video encoding and transcoding system 20 is also adapted to automatically optimize video files sizes.

Still referring to FIG. 1, preferred video encoding and transcoding system 20 is initiated when a user visits a video encoder website and uploads video content for processing on a web-based (cloud) application as illustrated by reference numeral 22. The user may then select his or her desired video resolution (output) as illustrated by reference numeral 24 and video content may be uploaded to a storage server as illustrated by reference numeral 26. Next, the video encoder website triggers a video encoder as illustrated by reference numeral 28 and the encoder downloads a copy of the video content to a server where the software resides to encode and transcode the software to make it available in streaming formats and optimize the file for viewing over the Internet on a plurality of different devices as illustrated by reference numeral 30. The downloaded copy of the video content is then transcoded to the desired resolution as illustrated by reference numeral 32. More particularly, the original video is encoded into multiple formats to accommodate different platforms or devices such as desktops, tablets, smartphones and the like having a variety of bandwidths, resolution screens and/or browsers. Preferably, the encoding process is repeated multiple times with different criteria so the resulting output files may be optimally utilized by any type of device.

Still referring to FIG. 1, the new video content may then be uploaded to a storage server as illustrated by reference numeral 34. Preferably, the video encoder processes the video content and simultaneously transcodes the video content in multiple formats. The preferred processed video content may be stored on video servers for downloading or streaming. In addition, the user may host and stream the processed video content from the system's server and/or the user's servers. In the event a user hosts and/or streams processed video content on a system server, the user is given an embed code and link code to direct customer's and other users to the video content location.

Still referring to FIG. 1, the preferred video encoding and transcoding system 20 is adapted to dynamically encode and transcode video content with an adaptive bit rate switching technology to automatically sense optimal playing environments and bit rate and/or resolution combinations for each user such that they can watch videos (in either the original or translated languages) without extensive re-buffering or re-caching (start and stopping) of the video playing. In the preferred video encoding and transcoding system 20, a user can start with any raw formatted video, send the file manually or automatically to the video encoding server, have the file encoded and then transcoded into multiple formats where the video can be viewed, downloaded, hosted, streamed, embedded using codes into other sites or applications and/or translate the video into additional languages. In addition, the preferred video encoding and transcoding system 20 may be configured host and stream the video after encoding and transcoding where the system will automatically sense a user's platform, browser and bandwidth and stream the most optimized file possible to the end user. In the preferred video encoding and transcoding system 20, after video content is encoded and transcoded to the user's requirements, the video can be hosted and/or streamed from the system's video servers, downloaded to the user's content delivery network (CDN) and/or embedded into other applications or websites.

While FIG. 1 illustrates the preferred configuration and arrangement of the video encoding and transcoding system, it is contemplated within the scope of the invention that the video encoding and transcoding system may be of any suitable configuration and arrangement.

Referring now to FIG. 2, a schematic block diagram of a first alternative embodiment of the video encoding and transcoding system that includes exemplary origination points and an exemplary process for encoding, transcoding, hosting and streaming video content in accordance with the present invention is illustrated. As shown in FIG. 2, the preferred video encoding and transcoding system is designated generally by reference numeral 40. Preferred video encoding and transcoding system 40 is initiated when a user visits a website page including video content as illustrated by reference numeral 42. The website page then determines the type of video support in the device used by the user to access the website page as illustrated by reference numeral 44. Next, the preferred video encoding and transcoding system 40 selects the format of the video content that is most compatible with the type of video support used by the user's device as illustrated by reference numeral 46. In preferred video encoding and transcoding system 40, the bandwidth of the platform is determined and a player such as an open source software program that plays videos on different platforms determines if a more appropriate resolution is available as illustrated by reference numeral 48. Thereafter, the player may interrupt the user's current stream of video content and pick it up immediately in the same spot with the new optimized video content without any buffering or skipping as illustrated by reference numeral 50.

The invention also comprises a method for encoding and transcoding video content. The preferred method comprises providing a video encoding and transcoding system as described herein. The preferred method also comprises visiting a video encoder website, selecting a desired resolution, uploading a video to a storage server, triggering an encoder, downloading a copy of the video, transcoding the video to a desired resolution and uploading a video to the storage server. The preferred method further comprises determining if a video is HTML5 or Flash supported, correcting the video format, determining a bandwidth and interrupting the current video stream. Preferably, HTML5 and Flash supported videos are formatted in MP4, iOS supported videos are formatted in MOV, and the current video stream is interrupted without buffering or skipping.

In operation, several advantages of the preferred embodiments of the video encoding and transcoding system are achieved. For example, the preferred embodiments of the video encoding and transcoding system allow for video encoding, transcoding, hosting and streaming using real time adaptive bit rate switching in HTML 5 and Flash so that users can take a raw video and automatically encode it into multiple resolutions and formats. The preferred embodiments of the video encoding and transcoding system are also adapted to automatically sense the platform, browser and bandwidth that will be playing each video and choose the most optimized format possible for that combination with the ability to change the bit rate stream in real time if the bandwidth changes. In addition, the preferred embodiments of the video encoding and transcoding system are adapted to allow each user to view a video in the most optimized format and resolution possible for their device, browser and bandwidth combination without having buffering take place while viewing the video. The preferred embodiments of the video encoding and transcoding system reduce video content file sizes by approximately 25-35%.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A method for encoding and transcoding video content, said method comprising:
    (a) providing a video encoding and transcoding system, said system comprising
        (i) a video content display unit; said video content display unit having a platform, a browser and a bandwidth and being adapted to display video content;
        (ii) a storage server, said storage server being adapted to receive video content;
        (iii) a video encoder, said video encoder being adapted to download video content and transcode video content;
    wherein the system automatically determines the platform, the browser and the bandwidth of the video content display unit and automatically selects the most optimized video format using real time adaptive bit rate switching in HTML5;
    (b) visiting a video encoder website;
    (c) selecting a resolution;
    (b) uploading a video to a storage server;
    (c) triggering an encoder;
    (d) downloading a copy of the video;
    (e) transcoding the video to a selected resolution; and
    (f) uploading the video to the storage server.

2. The method of claim 1 wherein the system automatically reduces re-buffering of memory.

3. The method of claim 1 wherein the system automatically eliminates re-buffering of memory.

4. The method of claim 1 wherein the system automatically reduces re-caching of memory.

5. The method of claim 1 wherein the system automatically eliminates re-caching of memory.

6. The method of claim 1 wherein the system translates video content in one language to video content in a different language.

7. The method of claim 1 wherein the system reduces the size of video content files.

8. The method of claim 1 wherein the system processes video content on a web-based application.

9. The method of claim 1 wherein the video encoder website triggers the video encoder.

10. The method of claim 1 wherein the video encoder downloads a copy of the video content to a software server.

11. The method of claim 1 wherein the system optimizes the video content for viewing on a plurality of different devices.

12. The method of claim 1 wherein the system transcodes the video content into multiple formats.

13. The method of claim 1 wherein the system encodes the video content into multiple resolutions.

14. The method of claim 1 wherein the video content is hosted on the system servers.

15. The method of claim 1 wherein the video content is streamed from the system servers.

16. The method of claim 1 wherein the video content is downloaded to a user content delivery network.

17. The method of claim 1 wherein the video content is embedded into other applications.

18. The method of claim 1 wherein the video content is embedded into other websites.

19. The method of claim 1 wherein the system interrupts the video content.

* * * * *